US012292206B2

(12) United States Patent
Johnson et al.

(10) Patent No.: US 12,292,206 B2
(45) Date of Patent: May 6, 2025

(54) MULTI-DWELLING TEMPERATURE MONITORING TECHNIQUES (71) Applicant: Alarm.com Incorporated, Tysons, VA (US)

(72) Inventors: Kyle Rankin Johnson, Falls Church, VA (US); Gustaf Nicolaus Maxwell Lonaeus, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 412 days.

(21) Appl. No.: 17/951,390

(22) Filed: Sep. 23, 2022

(65) Prior Publication Data

US 2023/0102333 A1    Mar. 30, 2023

Related U.S. Application Data (60) Provisional application No. 63/247,878, filed on Sep. 24, 2021.

(51) Int. Cl.
*F24F 11/00*  (2018.01)
*F24F 11/64*  (2018.01)
*F24F 11/80*  (2018.01)
F24F 110/12   (2018.01)
F24F 120/10   (2018.01)

(52) U.S. Cl.
CPC .............. *F24F 11/80* (2018.01); *F24F 11/64* (2018.01); *F24F 2110/12* (2018.01); *F24F 2120/10* (2018.01)

(58) Field of Classification Search
CPC ................................. F24F 11/64; F24F 11/80
See application file for complete search history.

(56) References Cited

U.S. PATENT DOCUMENTS

| | | | |
|---|---|---|---|
| 4,164,172 A | 8/1979 | Anderten et al. | |
| 4,995,307 A | 2/1991 | Floyd | |
| 5,971,067 A | 10/1999 | Rayburn et al. | |
| 7,113,090 B1 | 9/2006 | Saylor et al. | |
| 8,596,079 B2 | 12/2013 | Beam | |
| 8,695,888 B2 | 4/2014 | Kates | |
| 9,064,394 B1 | 6/2015 | Trundle | |
| 9,447,983 B2 | 9/2016 | Smith et al. | |
| 9,551,504 B2 | 1/2017 | Arensmeier et al. | |
| 9,645,017 B2 | 5/2017 | Kramer et al. | |
| 9,677,777 B2 | 6/2017 | Karamanos et al. | |
| 9,976,763 B2 | 5/2018 | Leeland et al. | |
| 10,126,009 B2 | 11/2018 | Flaherty et al. | |
| 10,281,166 B1 | 5/2019 | Hutz | |

(Continued)

Primary Examiner — Mark A Connolly
(74) Attorney, Agent, or Firm — Fish & Richardson P.C.

(57) ABSTRACT

Methods, systems, and apparatus, including computer programs encoded on computer-storage media, for temperature control. In some implementations, a method includes obtaining first temperature data associated with a first climate control component of a first dwelling of a property; obtaining second temperature data associated with a second climate control component of a second dwelling of the property; determining a leak effect between the first dwelling and the second dwelling using the first temperature data and the second temperature data; determining an instruction to adjust operation of the first climate control component using the leak effect; and providing the instruction to the first climate control component.

20 Claims, 5 Drawing Sheets

(56) References Cited

U.S. PATENT DOCUMENTS

| | | |
|---|---|---|
| 10,845,077 B1 | 11/2020 | Hutz |
| 10,845,079 B1 | 11/2020 | Picardi et al. |
| 10,995,968 B2 | 5/2021 | Ray et al. |
| 2002/0134849 A1 | 9/2002 | Disser |
| 2004/0061091 A1 | 4/2004 | Tieken |
| 2006/0183419 A1 | 8/2006 | Kettler |
| 2007/0072541 A1 | 3/2007 | Daniels, II et al. |
| 2008/0004904 A1 | 1/2008 | Tran |
| 2008/0078332 A1 | 4/2008 | Conger et al. |
| 2008/0161976 A1 | 7/2008 | Stanimirovic |
| 2009/0065595 A1 | 3/2009 | Kates |
| 2010/0061865 A1 | 3/2010 | Goldman et al. |
| 2010/0082162 A1 | 4/2010 | Mundy et al. |
| 2011/0118896 A1 | 5/2011 | Holloway |
| 2011/0204720 A1 | 8/2011 | Ruiz et al. |
| 2012/0046792 A1 | 2/2012 | Secor |
| 2012/0072029 A1 | 3/2012 | Persaud et al. |
| 2015/0060037 A1 | 3/2015 | Norrell et al. |
| 2015/0075373 A1 | 3/2015 | Miller |
| 2015/0168003 A1 | 6/2015 | Stefanski et al. |
| 2015/0282440 A1 | 10/2015 | Shelor |
| 2015/0304171 A1 | 10/2015 | Kim et al. |
| 2016/0025363 A1 | 1/2016 | Kates |
| 2016/0146493 A1 | 5/2016 | Ettl et al. |
| 2017/0292725 A1 | 10/2017 | Conley et al. |
| 2018/0039904 A1 | 2/2018 | Stevens et al. |
| 2018/0075618 A1 | 3/2018 | Lai et al. |
| 2018/0100663 A1* | 4/2018 | Crimins .................. F24F 11/46 |
| 2018/0109906 A1 | 4/2018 | Sentz et al. |
| 2018/0121808 A1 | 5/2018 | Ramakrishna et al. |
| 2018/0338310 A1 | 11/2018 | Erceg et al. |
| 2018/0340719 A1 | 11/2018 | Rona et al. |
| 2018/0357568 A1 | 12/2018 | Ding et al. |
| 2019/0195528 A1 | 6/2019 | Puranen et al. |
| 2019/0213446 A1 | 7/2019 | Tsou et al. |
| 2019/0303569 A1 | 10/2019 | Cheng |
| 2020/0356901 A1 | 11/2020 | Zarandioon et al. |
| 2021/0025611 A1* | 1/2021 | Turner .................... F24F 11/38 |
| 2021/0071885 A1 | 3/2021 | Hutz |
| 2021/0071889 A1 | 3/2021 | Picardi et al. |

\* cited by examiner

```
┌─────────────────────────────────────────────────────────────────┐
│ OBTAIN FIRST TEMPERATURE DATA ASSOCIATED WITH A FIRST CLIMATE   │
│ CONTROL COMPONENT OF A FIRST DWELLING OF A PROPERTY         510 │
└─────────────────────────────────────────────────────────────────┘
                                 │
                                 ▼
┌─────────────────────────────────────────────────────────────────┐
│ OBTAIN SECOND TEMPERATURE DATA ASSOCIATED WITH A SECOND         │
│ CLIMATE CONTROL COMPONENT OF A SECOND DWELLING OF THE           │
│ PROPERTY                                                    520 │
└─────────────────────────────────────────────────────────────────┘
                                 │
                                 ▼
┌─────────────────────────────────────────────────────────────────┐
│ DETERMINE A LEAK EFFECT BETWEEN THE FIRST DWELLING AND THE      │
│ SECOND DWELLING USING THE FIRST TEMPERATURE DATA AND THE        │
│ SECOND TEMPERATURE DATA                                     530 │
└─────────────────────────────────────────────────────────────────┘
                                 │
                                 ▼
┌─────────────────────────────────────────────────────────────────┐
│ DETERMINE AN INSTRUCTION TO ADJUST OPERATION OF THE FIRST       │
│ CLIMATE CONTROL COMPONENT USING THE LEAK EFFECT             540 │
└─────────────────────────────────────────────────────────────────┘
                                 │
                                 ▼
┌─────────────────────────────────────────────────────────────────┐
│ PROVIDE THE INSTRUCTION FOR OUTPUT                          550 │
└─────────────────────────────────────────────────────────────────┘
```

FIG. 5

MULTI-DWELLING TEMPERATURE MONITORING TECHNIQUES

CROSS-REFERENCE TO RELATED APPLICATION

This application claims the benefit of U.S. Provisional Application No. 63/247,878, filed Sep. 24, 2021, the contents of which are incorporated by reference herein.

TECHNICAL FIELD

This disclosure relates to home monitoring technology.

BACKGROUND

Multi-dwelling units (MDUs) refer to a classification of housing where multiple separate housing units for residents are contained within one or more buildings within a complex. Units can be next to each other (side-by-side units), or stacked on top of each other (top-and-bottom units). Examples of MDUs include apartment buildings, mixed use buildings, rowhouses (townhouses), terraced houses, cluster houses, duplexes, among others. In some instances, an MDU may include condominium units in which each individual unit is owned by an entity rather than leased from a single owner to multiple tenants.

Some MDUs include dedicated climate control components within each unit that each provide temperature monitoring and regulation for a corresponding MDU. This may be provided using different heating ventilation, and air conditioning (HVAC) configurations. For example, each apartment unit may include a dedicated thermostat and corresponding HVAC components that allow a user to adjust temperature control within a corresponding apartment unit. Because MDUs are often associated with distinct residences, climate control components of individual MDUs do not exchange data communications as they are configured separately, may be generated with different manufacturers, and/or may be managed by different service providers.

SUMMARY

This disclosure is focused on systems and techniques for collectively monitoring temperature data generated by climate control components of two or more dwellings in an MDU to configure and/or adjust operations of each climate control component based on the monitored data to improve overall efficiency. In some MDUs, individual dwellings are often configured as adjoining units, which sometimes influences temperature regulation between dwellings. For example, if a wall shared by two dwellings produces a leak effect, then a heating operation within one dwelling may result in undesired heating within the second dwelling. The systems and techniques disclosed herein permit identification of such leak effects and coordinate operations of individual climate control components to provide various advantages in such scenarios.

The systems disclosed herein may determine the impact of a leaking effect on a certain dwelling and then use this impact to adjust the operation of a climate control unit of the dwelling. For example, if the dwelling is being heated at a faster rate than anticipated (due to heating in adjoining dwellings), then the systems may reduce the amount of time of a heating operation within the property to achieve a target setpoint temperature. As another example, if the climate control components of a set of adjoining dwellings are identified to be performing heating operations during an overlapping time period, then the systems may reduce the extent of heating (e.g., target temperature, time period for heating) given the likelihood of the leaking effect resulting in a greater amount of heating within each of the set of dwellings. Though these scenarios focus on heating, similar principles and/or techniques are applicable to cooling operations.

One example of a system disclosed within this specification is a multi-dwelling monitoring system of coordinating climate control operations between two or more dwellings of an MDU. This system generally includes individual monitoring systems of each dwelling and a server configure to communicate with the individual monitoring systems over a network-based connection. Each individual monitoring system of a dwelling can include a control unit, one or more sensors, one or more appliances, and a climate control component (e.g., thermostat). The server monitors data generated by each of the individual monitoring systems and determines adjustments to climate control at each of the two or more dwellings. The data monitored by the server can include occupancy data (e.g., time periods when a dwelling is occupied by users), temperature data (e.g., ambient temperature measured by a climate control component, a user-specified setpoint temperature, a target temperature used for initiating or terminating climate control operations), among other types of information that may collected for a dwelling. The server use the monitored data in parallel and thereby adjust and/or control climate control at each of the dwellings accordingly.

As described throughout, a "leak effect" refers generally to the effect on temperature regulation within a dwelling due to one or more leaks within an MDU. For example, a leak effect may result from insufficient insulation in a wall shared between adjoining dwellings, resulting in heat being transferred from one dwelling to the other dwelling through the shared wall. As another example, a leak effect may result from one or more air leaks on surfaces, which may similarly introduce heat leaks. In other examples, a leak effect may be caused by other types of circumstances that would be understood to lead to the transfer of hot air and/or cold air.

The systems disclosed herein provide various advantages to climate control management of an MDU based on monitoring of data generated at dwellings of the MDU. The systems accomplish this by identifying leak effects between dwellings and using such identification to determine how to configure climate control components of individual dwellings to, for example, provide cost savings to users, reduce overall energy consumption at the MDU, or prevent undesirable consequences to dwellings resulting from leak effects (e.g., a dwelling becoming too hot or too cold). Thus, by examining data generated by monitoring systems of the dwellings, the systems can determine how to coordinate climate control operations at each dwelling in a productive manner that takes advantage of leak effects while also maintaining user preferences (e.g., setpoint temperatures).

Implementations of the described techniques may include hardware, a method or process implemented at least partially in hardware, or a computer-readable storage medium encoded with executable instructions that, when executed by a processor, perform operations.

One innovative aspect of the subject matter described in this specification is embodied in a method that includes obtaining first temperature data associated with a first climate control component of a first dwelling of a property; obtaining second temperature data associated with a second climate control component of a second dwelling of the property; determining a leak effect between the first dwelling and the second dwelling using the first temperature data and the second temperature data; determining an instruction to adjust operation of the first climate control component using the leak effect; and providing the instruction to the first climate control component.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include obtaining occupancy data indicating the first dwelling of the property is occupied or unoccupied, where determining the instruction includes determining the instruction to adjust operation of the first climate control component using the occupancy data.

In some implementations, determining the leak effect includes determining that a current performance of the first climate control component does not match a predicted performance of the first climate control component.

In some implementations, actions include determining the predicted performance of the first climate control component using historical performance data for the first climate control component.

In some implementations, the instruction is configured to, when received by the first climate control component, cause the first climate control component to adjust operation. In some implementations, the instruction is configured to, when received by the first climate control component, cause the first climate control component to increase a heating operation.

In some implementations, the leak effect is a heating leak effect that causes a portion of the first dwelling to heat as a result of heating by the second climate control component.

In some implementations, the instruction is configured to, when received by the first climate control component, cause the first climate control component to reduce a heating operation or increase a cooling operation.

In some implementations, the leak effect is a cooling leak effect that causes a portion of the first dwelling to cool as a result of cooling by the second climate control component.

In some implementations, the instruction is configured to, when received by the first climate control component, cause the first climate control component to increase a heating operation or reduce a cooling operation.

In some implementations, the first temperature data or the second temperature data includes one or more of a status of the respective climate control component, a current ambient temperature measured in a portion of the respective dwelling, an estimated performance of the respective climate control component, a setpoint temperature of the respective dwelling, or a target temperature used by the respective climate control component for temperature monitoring and regulation.

The details of one or more implementations are set forth in the accompanying drawings and the description, below.

Other potential features and advantages of the disclosure will be apparent from the description and drawings, and from the claims.

The details of one or more implementations are set forth in the accompanying drawings and the description below. Other features will be apparent from the description and drawings.

DESCRIPTION OF DRAWINGS

In the drawings, like reference numbers represent corresponding parts throughout.

DETAILED DESCRIPTION

In general, this disclosure describes systems and techniques for collectively monitoring temperature data generated by climate control components of two or more dwellings in an MDU to configuring and/or adjusting operations of each climate control component based on the monitored data to improve overall efficiency.

Figure 1:
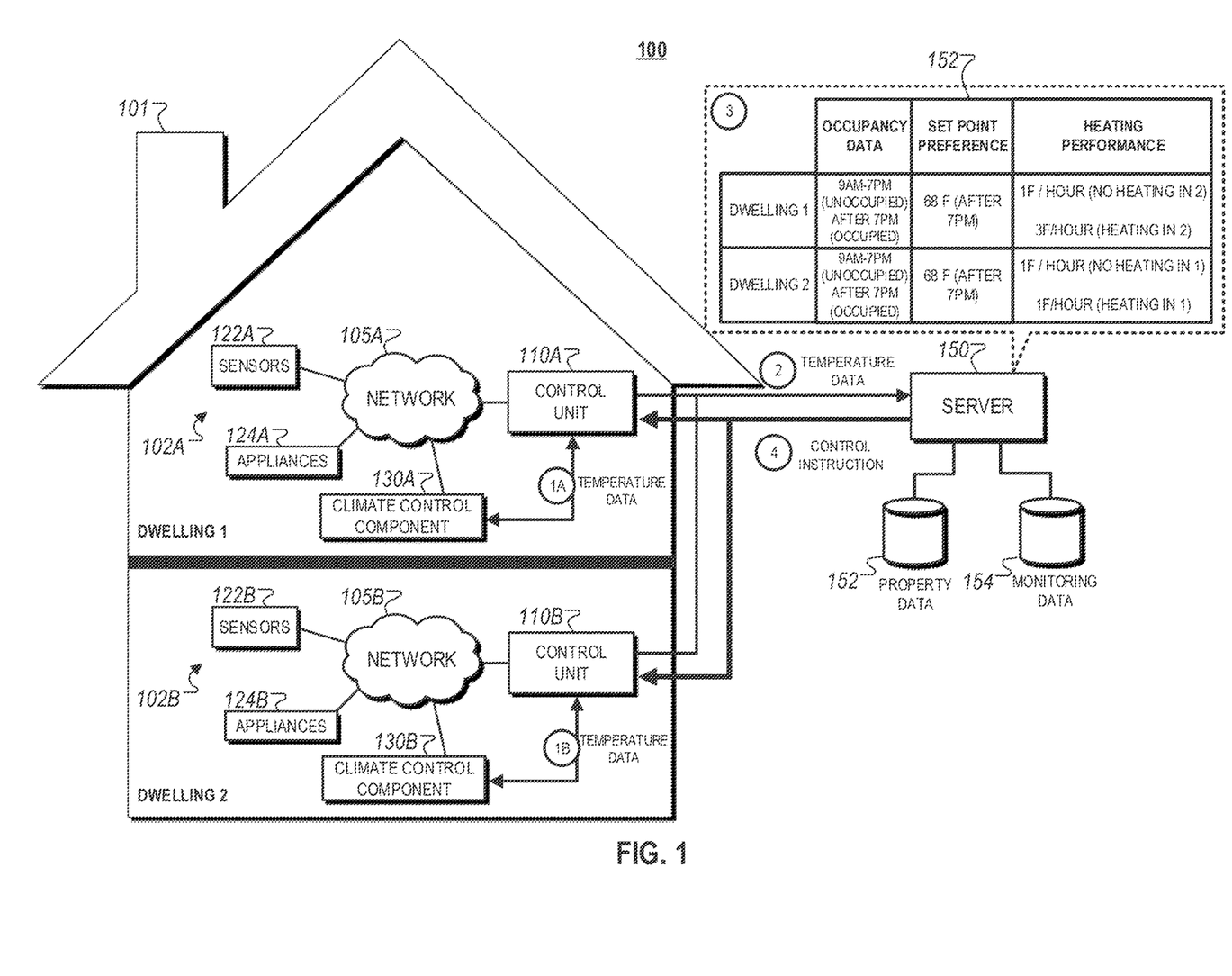
FIG. 1 illustrates an example of a multi-dwelling monitoring system.

FIG. 1 illustrates an example of a multi-dwelling monitoring system 100. In this example, the system 100 includes two monitoring systems 102A, 102B located in two dwellings of a property 101 (e.g., dwelling 1, dwelling 2) and an associated server 150. The first monitoring system 102A includes control units 110A, 110BA, sensors 122A, appliances 124A, and climate control component 130A. The second monitoring system 102B includes control unit 110B, sensors 122B, appliances 124B, and climate control component 130B, which exchange communications. As shown, the first monitoring system 102A communicates with server 150 over network 105A via control unit 110A, and the second monitoring system 102B communicates with server 150 over network 105B via control unit 110B.

As shown in FIG. 1, the system 100 is configured to provide a technique that permits the server 150 to monitor and control the monitoring systems 102A, 102B in a coordinated fashion. This technique is depicted in FIG. 1 as a set of enumerated steps. At steps 1A and 1B, control units 110A and 110B obtain temperature data from climate control components 130A, 130B, respectively. The temperature data identifies an ambient temperature measured by each climate control component within a corresponding dwelling. At step 2, the server 150 obtains the temperature data from control units 110A, 110B. At step 3, the server 150 processes the obtained temperature data in relation to stored data (e.g., property data 152, monitoring data 154) to generate table 152. In the example shown in FIG. 1, table 152 includes, for each dwelling, occupancy data, a user setpoint preference for ambient temperature, and heating performance of a corresponding climate control component. At step 4, the server 150 generates control instructions for the climate control components 130A, 130B based on the information specified in table 152 and provides the control instructions for output.

Figure 2:
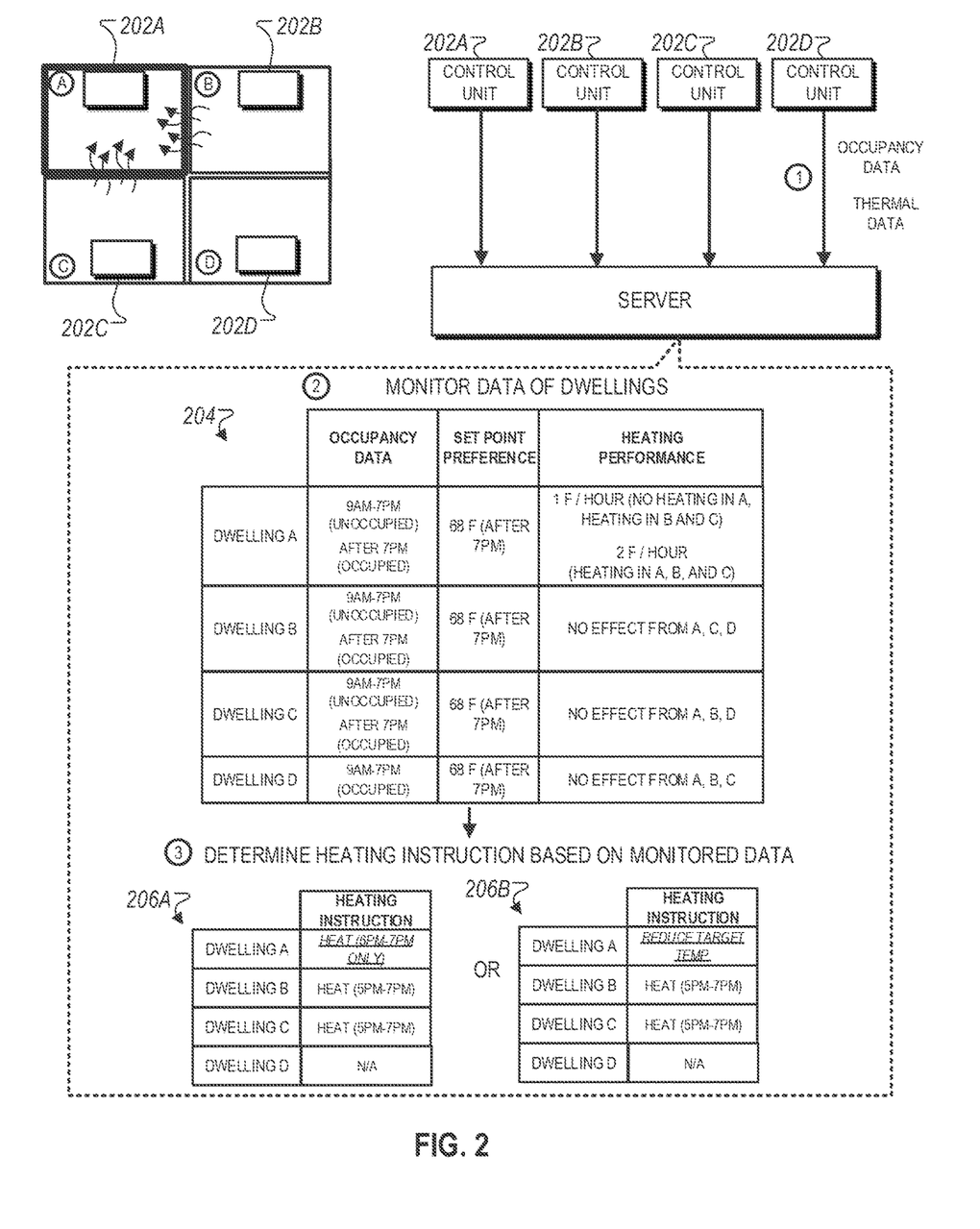
FIG. 2 illustrates an example of a technique for adjusting a climate control component of a property dwelling based on monitoring temperature data generated by climate control components of adjoining property dwellings.
Figure 3:
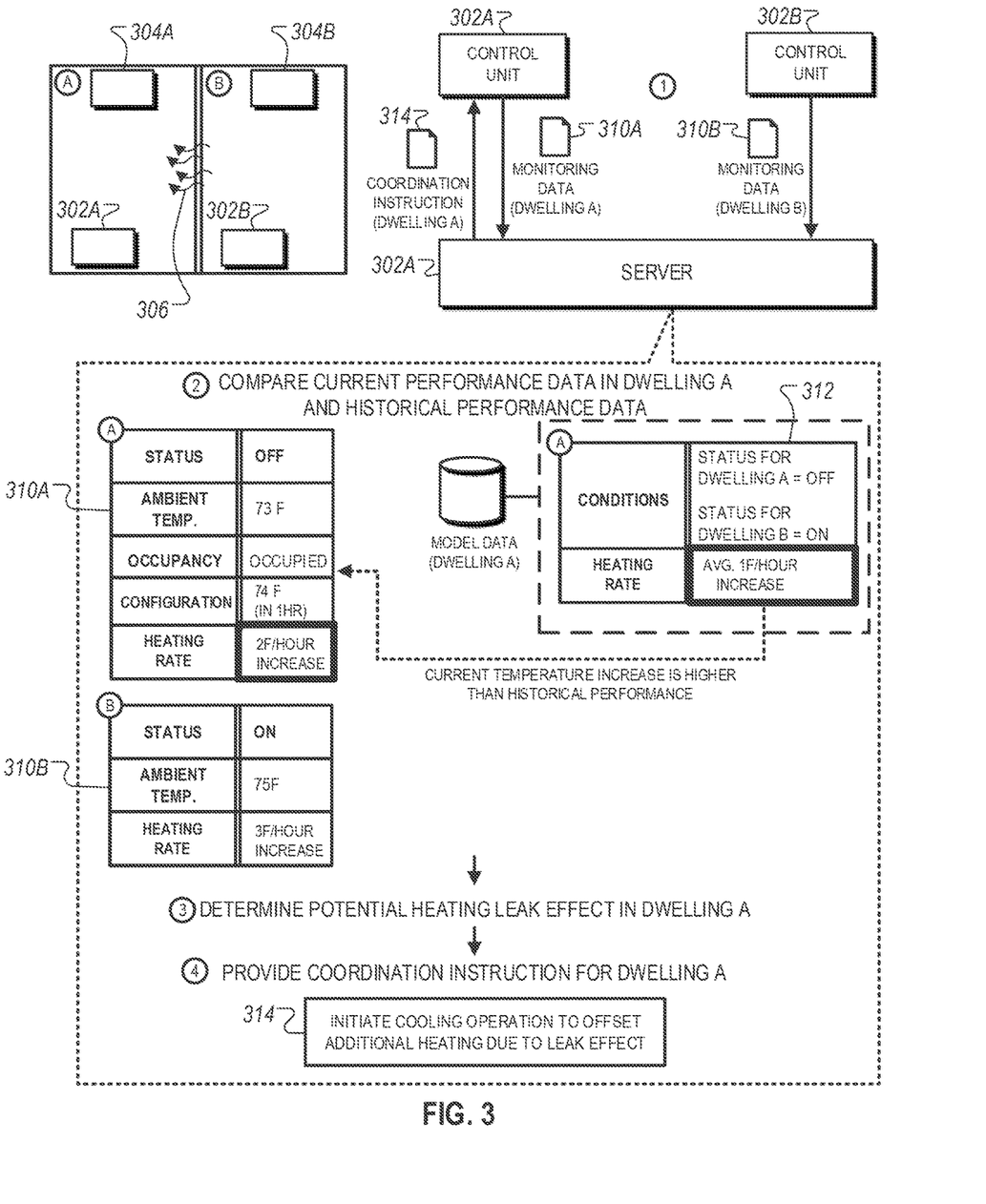
FIG. 3 illustrates an example of a technique for maintaining ambient temperature within a property dwelling based on based on monitoring temperature data generated by a climate control component of an adjoining property dwelling.
Figure 4:
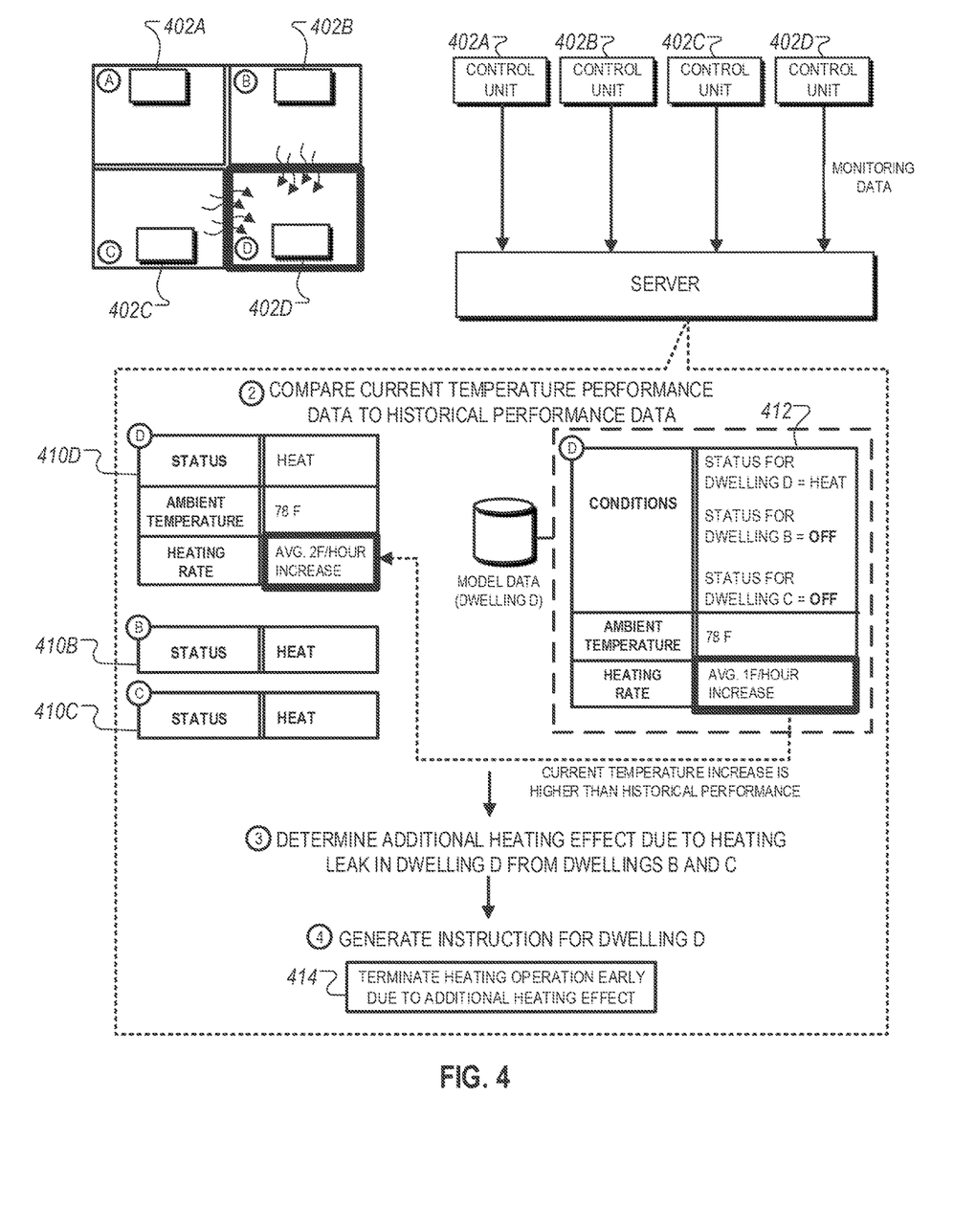
FIG. 4 illustrates an example of a technique for improving energy efficiency of a climate control component based on monitoring temperature data generated by climate control components of adjoining property dwellings.

As discussed in greater detail with respect to FIGS. 2-4, the server 150 can use information specified in table 152 in different scenarios to determine how to configure each climate control component. The server 150 can productively configure the climate control components to provide advantages, such as energy savings, cost reduction, and/or reduce the likelihood of undesirable effects.

The monitoring systems 102A, 102B may be configured in various ways in various implementations that are contemplated within this disclosure. In some implementations, such as the example shown in FIG. 1, monitoring systems 102A, 102B have the same or similar components. For example, property 101 may be an apartment building with dwellings represented as apartments with similar or identical floor plans. In such implementations, the monitoring systems 102A, 102B may have similar configurations (e.g., the same number of sensors, the same climate control components, etc.). In other implementations, the monitoring systems 102A, 102B may have different components or configurations. For example, property 101 may be a building with dwellings represented as condominium units with different floorplans. In such implementations, the monitoring systems 102A, 102B may have different configurations (e.g., different sets of sensors located in the property, climate control components with different number of vents). For simplicity, the descriptions that follow reference functionality of the components of monitoring system 102A, which should be understood to be similarly applicable to the components of monitoring system 102B.

Referring now to the components of the system 100, the network 105A may be configured to enable electronic communications between electronic devices. For example, the network 105A may be configured to enable exchange of electronic communications between the control unit 110A, the sensors 122A, the appliances 124A, the climate control component 130A, and the server 150. The network 105A may include local area networks (LANs), Wi-Fi, or analog or digital wired and wireless networks. The network 105A may include multiple networks or subnetworks, each of which may include, for example, a wired or wireless data pathway. The network 105A may also include a circuit-switched network, a packet-switched data network, or any other network able to carry electronic communications (e.g., data or voice communications). For example, the network 105A may include networks based on the Internet protocol (IP), or other comparable technologies. In some examples, the network 105A may include wide area networks (WAN) of computers that receive services provided by a service provider.

The control unit 110A can be a computing device that controls aspects of monitoring operations performed by the components of the system 100. The control unit 110A can include a controller and a network module. The controller can be configured to control, for example, temperature monitoring and adjustment by climate control component 130A. In some examples, the controller includes a processor or other control circuitry configured to execute instructions of a program that controls operation of the system 100. In these examples, the controller can be configured to receive input from sensors, detectors, or other devices associated with the system 100 and control operation of components of the system 100, such as a camera, a temperature sensor, an activity sensor, climate control components, etc. For example, the controller may be configured to control operation of the network module included in the control unit 110A.

The network module of the control unit 110A can be a communication device configured to exchange communications over the network 105A. The network module can be a wireless communication module configured to exchange wireless communications over the network 105A. For example, the network module can be a wireless communication device configured to exchange communications over a short-range wireless network. The network module can also be configured to exchange communications over the network 105A using a wireless connection. For instance, the network module can enable the control unit 110A to exchange communications with the server 150 over the network 105A without the use of the network 105A. The wireless communication device can include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi.

The network module can also may be a wired communication module configured to exchange communications over the network 105A using a wired connection. For instance, the network module can be a modem, a network interface card, or another type of network interface device. The network module can be an Ethernet network card configured to enable the control unit 110A to communicate over a local area network and/or the Internet. The network module can also be a voiceband modem configured to enable an alarm panel to communicate over the telephone lines of Plain Old Telephone Systems (POTS). In some implementations, the alarm panel may be a broadband or cellular gateway where the network module may enable the control unit 110A to communicate over the network 105A.

The control unit 110A can communicate with sensors 122A, appliances 124A, climate control component 130A, and server 150 to wirelessly transmit data over the network 105A. In some instances, the control unit 110A may periodically receive data activity reports from the sensors 122A, the appliances 124A, and climate control component 130A, that include information related to a dwelling in the property 101, e.g., occupancy data, activity data, movement data, temperature data, among others.

The sensors 122A may include various types of sensors that are placed within a property. For example, the sensors 122A can include a contact sensor, a motion sensor, a glass break sensor, an occupancy sensor, an activity sensor, or any other type of sensor that is typically included in a monitoring system or security system. The sensors 122A also can also include environmental sensors such as an ambient temperature sensor, a water sensor, a rain sensor, a wind sensor, a light sensor, a smoke detector, a carbon monoxide detector, an air quality sensor, etc.

The appliances 124A can be home automation devices connected to the network 105A that are configured to exchange electronic communications with other devices of the system 100. The appliances 124A may include, for example, connected kitchen appliances, controllable light sources, safety and security devices, energy management devices, and/or other types of electronic devices capable of exchanging electronic communications over the network 105A. In some instances, the appliances 124A may periodically transmit information and/or generated data to the control unit 110A such that the control unit 110A can automatically control the operation of the appliances 124A based on the exchanged communications. For example, the control unit 110A can operate one or more of the appliances 124A based on a fixed schedule specified by the user. In another example, the control unit 110A may enable or disable one or more of the appliances 124A based on received sensor data from the sensors 122A.

The climate control component 130A can be a regulating device configured to perform operations relating to temperature monitoring and control within a dwelling. For example, climate control component 130A can be a thermostat that senses air temperature and performs actions to control an HVAC system so that the sensed temperature is maintained near a desired setpoint temperature. In some implementations, climate control component 130A includes a thermostat and HVAC components used for heating/cooling operations. For example, climate control component 130A may include a furnace, a heat exchanger, evaporator coil, refrigerant lines, a condenser, vents, and ductwork.

The server 150 can be one or more electronic devices configured to provide monitoring services by exchanging electronic communications with the control unit 110A, sensors 122A, appliances 124A, and climate control component 130A over the network 105A. For example, the server 150 can be configured to monitor events, e.g., a measured user temperature satisfying a threshold, generated by the control units 110A, 110B and/or other devices connected over the network 105A. In this example, server 150 may exchange electronic communications with the network module included in the control unit 110A to receive information regarding events detected by the control unit 110A. The server 150 can also receive information regarding events from the climate control component 130A, e.g., current ambient temperature, current setpoint temperature, heating/cooling rate associated with ongoing climate control operations, changes in ambient temperature, changes in setpoint temperature, among others.

In some implementations, the server 150 generates model data for each dwelling within property 101 based on monitoring data collected by control units 110A and 110B over time. The model data can identify historical operations performed by climate control components (e.g., number of heating operations, number of cooling operations, time periods during which heating/cooling operations performed, target temperatures associated with heating/cooling operations performed, etc.). The model data can also identify performance-related information associated with the historical operations (e.g., heating rate, cooling rate), among others. In some instances, server 150 uses the model data evaluate runtime monitoring data collected for climate control components 130A, 130B. For instance, as shown in FIGS. 3 and 4, the server 150 can compare information specified in runtime data to historical information specified by model data to identify potential leaks that impact heating/cooling performance in individual dwelling. The server 150 can then adjust the operation of climate control components based on identification of potential leaks, as discussed throughout this disclosure.

In some implementations, the server 150 monitors various types of data generated by monitoring systems located in dwellings of an MDU in addition to temperature data. For example, the server 150 can monitor data generated by sensors 122A or the appliances 124A, such as occupancy data, device usage data, activity data, movement data, among others. The server 150 can process the monitored data to develop inferences associated with dwellings within an MDU. For example, the server 150 can use occupancy data to identify time periods when dwellings are occupied by residents and other time periods when dwellings are unoccupied. As another example, the server 150 can use input data to identify user preferences, such as temperature preference for specified time points (e.g., when a dwelling is expected to become occupied), user comfort level for specified temperature ranges based on prior setpoint temperature adjustments, among others. In this way, the server 150 can use monitoring data in parallel with temperature data to regulate and/or control climate control components located in dwellings of an MDU.

FIG. 2 illustrates an example of a technique for adjusting a climate control component of a dwelling based on monitoring temperature data generated by climate control components of adjoining property dwellings. In this example, an MDU includes four dwellings—dwellings A, B, C, D. Each of dwellings A-D includes a control unit for coordinating a monitoring system within a corresponding dwelling. For example, control unit 202A is located in dwelling A, control unit 202B is located in dwelling B, control unit 202C is located in dwelling C, and control unit 202D is located in dwelling D. Control units 202A-D communicate with server 150. In this example, though control units 202A-D are each associated with distinct monitoring systems that do not share communications (e.g., control units 202A-D are connected to different LANs), control units 202A-D may be associated with the same monitoring service and/or monitoring platform. For example, the monitoring systems within dwellings A-D may be configured with software and/or hardware produced by the same manufacturer. In other examples, the monitoring systems within dwellings A-D may be configured to transmit collected data to a third-party data service provider that aggregates data collected for multiple dwellings. Regardless of the implementation, the server 150 is capable of obtaining monitoring data for the monitoring systems within dwellings to perform multi-dwelling temperature monitoring techniques discussed throughout.

The technique shown in FIG. 2 proceeds in a set of enumerated steps. At step 1, the server 150 obtains occupancy data and temperature data from each of the control units 202A-D. The server 150 can obtain data periodically (e.g., hourly, daily, weekly, monthly) or on ad-hoc basis based on the configuration of the MDU. In some instances, the server 150 collects the data in response to certain trigger event, such as a climate control component being enabled or disabled in one of the dwellings 202A-D, an indication that all climate control units are actively heating or cooling, or based on external weather conditions that may have an impact on temperature monitoring within dwellings A-D.

At step 2, server 150 monitors data obtained from control units 202A-C to identify opportunities for adjusting the configuration of one or more climate control components within the dwellings A-D. As shown in table 204, monitored data includes occupancy data indicating time periods when dwellings A-D are identified as being occupied or unoccupied, setpoint temperature preferences of users of dwellings A-D, and a current heating performance of climate control components located in dwellings A-D. The heating performances shown in table 204 also indicate whether climate control configurations of adjoining dwelling have an effect on the climate control of a particular dwelling. For example, the server 150 determines that the heating rate (in degrees/time) in dwelling A is increased from 1 F/hour to 2 F/hour if heating operations are also being performed in dwellings B and C during the same time frame. As discussed throughout, this difference in heating performance may be attributable to a leak effect that results in residual heat being transferred to dwelling A from dwellings B and C (as shown on the top left side of the FIG. 2). Using information relating to this increased heating rate, the server 150 can determine a heating instruction for dwelling A that both achieves the setpoint preference but also reduces energy consumption.

At step 3, the server 150 determines a heating instruction that adjusts climate control within dwelling A based on the information specified in table 204. FIG. 2 shows two examples of heating instructions that may be used to reduce energy consumption. The first example is heating instruction 206A, which involves adjusting the overall time period during which a heating operation is carried out in dwelling A. In this example, dwelling A has a baseline configuration of performing a heating operation for two hours (5 PM-7 PM) to allow the ambient temperature to reach the setpoint temperature of 68 F after 7 PM. The baseline configuration is based on the baseline heating performance of 1 F/hour and the current air temperature at 5 PM being 66 F (i.e., 2 F below the setpoint temperature, two hours before 7 PM). However, because server 150 determines that heating operations are also being performed at dwellings B and C between 5 PM-7 PM (which then causes heating performance in dwelling A to increase to 2 F/hour when heating is enabled in dwelling A), server 150 determines that the setpoint temperature can be achieved by 7 PM with only one hour of heating (as opposed to the baseline configuration of two hours of heating). The instruction 206A thereby specifies one hour of heating in dwelling A from 6 PM-7 PM even though the air temperature is 66 F around 5 PM.

The second example is heating instruction 206B, which involves reducing the target temperature in dwelling A that is used to disable an active heating operation. Like the first example discussed above, in this example, server 150 determines that ongoing heating operations in dwellings B and C are likely to result in increased heating performance in dwelling A before 7 PM (after which a user is expected to occupy the property). Because of this, the server 150 reduces a target temperature that is used by a thermostat to control when to stop a heating operation. For example, a baseline target temperature of 68F may be used by a thermostat to determine when to stop a heating operation in dwelling A since this matches the setpoint temperature. However, because of ongoing heating operations in dwellings B and C between 5 PM-7 PM, server 150 determines that air temperature in dwelling A may continue to rise even if no active heating is being performed within. The server 150 thereby reduces the target temperature to 67 F so that the thermostat terminates the heating operation in dwelling A at an earlier time (compared to the baseline condition). Using this configuration, the server 150 reduces energy consumption in dwelling A since once its heating operation is terminated at an air temperature of 67 F, passive heating through ongoing heating operations in dwellings B and C are then used to increase the air temperature in dwelling A to achieve the setpoint temperature of 68 F.

FIG. 3 illustrates an example of a technique for maintaining ambient temperature within a property dwelling based on based on monitoring temperature data generated by a climate control component of an adjoining property dwelling. In this example, an MDU includes two dwellings—dwellings A and B. Each of dwellings A, B includes a control unit that controls a climate control component within a corresponding dwelling. For example, control unit 302A and climate control component 304A are located in dwelling A, and control unit 302B and climate control component 304B are located in dwelling B. Control units 302A, 302B communicate with server 150. In this example, though control units 302A, 302B are each associated with distinct monitoring systems that do not share communications (e.g., control units 302A, 302B are connected to different LANs), control units 302A, 302B may be associated with the same monitoring service and/or monitoring platform, as discussed throughout.

The technique shown in FIG. 3 proceeds in a set of enumerated steps. At step 1, the server 150 obtains monitoring data 310A from control unit 302A and monitoring data 310B from control unit 302B. As discussed throughout, the server 150 can obtain the data periodically (e.g., hourly, daily, weekly, monthly) or on ad-hoc basis based on the configuration of the MDU. In some instances, the server 150 collects the data in response to certain trigger event, such as a climate control component being enabled or disabled in one of the dwellings A and B, an indication that all climate control units are actively heating or cooling, or based on external weather conditions that may have an impact on temperature monitoring within dwellings A, B.

As shown in FIG. 3, monitoring data 310A and 310B indicate various types of information relating to present conditions at dwellings A, B. Monitoring data 310A indicates that climate control component 304A is currently turned off (no ongoing heating or cooling operation). Monitoring data 310A also indicates that the current ambient temperature within dwelling A is 73 F, that the dwelling A is presently occupied, that the setpoint temperature is set to 74 F in hour, and also that the present heating rate is 2 F/hour. Monitoring data 310B indicates that climate control component 304B is turned on (e.g., ongoing heating operation), that the ambient temperature in dwelling B is 75 F, and the current heating rate in dwelling B is 3 F/hour. The server 150 monitors information specified by monitoring data 310A, 310B in parallel to develop inferences relating to temperature regulation in dwellings A, B.

At step 2, server 150 compares information within monitoring data 310A to information specified in model data 312 and determines that the current heating rate in dwelling A is higher than historical heating rates that were recorded during previous heating operations. This determination is based on the monitoring data 310A indicating a present heating rate of 2 F/hour, which is higher than an average heating rate of 1 F/hour of climate control component 304A within model data 312 under similar conditions (climate control component 304A being turned off, climate control component 304B conducting a heating operation).

At step 3, server 150 determines a potential heating leak effect in dwelling A based on monitoring data 310A, model data 312, and monitoring data 310B. This determination is based on the discrepancy between the heating rate specified by the monitoring data 310A and the heating rate specified by the model data 312 under similar circumstances. Given this discrepancy, server 150 may determine that other extenuating circumstances may be impacting the temperature increase in ambient temperature within dwelling A. For example, given that an ongoing heating operation is being performed in dwelling B and the climate control component 304A being turned off in dwelling A, server 150 can determine that there may be a potential heating leak effect in dwelling A based on ongoing heating operation in dwelling B. In some instances, this determination can be based on cross-referencing historical data relating to property conditions when both climate control components 304A, 304B are both turned off. In such instances, server 150 can use such information to confirm that the increased heating rate in dwelling A is attributable to circumstances during which an ongoing heating operation is being performed in dwelling B.

At step 4, server 150 generates a coordination instruction 314 based on determining a potential heating leak effect in dwelling A. Server 150 determines that the current heating rate in dwelling A (2 F/hour) will not satisfy the setpoint temperature configuration of 74 F in one hour. This is due to the current ambient temperature in dwelling A being 73 F, which would result in the ambient temperature reaching 75 F in one hour (based on the current heating rate). Given this prediction, server 150 determines that action may be needed to ensure that the setpoint temperature is achieved. One way to accomplish this is by generating a coordination instruction 314 to initiate a cooling operation in dwelling A to offset the additional heating due to the potential heating leak effect.

Server 150 provides the instruction 314 to control unit 302A, which, when received by the control unit 302A, configures climate control component 304A to initiate a cooling operation in dwelling A for at least the next hour. The cooling operation may be configured to reduce the ambient temperature in dwelling A by 1 F/hour so that the total increase in air temperature in the next hour is 1 F/hour (i.e., 2 F/hour increase in ambient temperature due to the potential heating leak effect from dwelling B minus a 1 F/hour decrease in ambient temperature due to the cooling operation specified by instruction 314).

As discussed above, the technique shown in FIG. 3 allows the server 150 to coordinate climate control operations in individual dwellings of an MDU by monitoring data generated at the dwellings in parallel and comparing the monitored data to historical data. By detecting potential leaks and assessing impacts to temperature regulation within the dwellings, the server 150 can generate and provide instructions to configure climate control components to satisfy, for example, user-specified setpoint temperature preferences. In the example shown in FIG. 3, a cooling operation is initiated in dwelling A to offset an increased heating rate due to a heating leak effect from an ongoing heating operation in dwelling B. This increases the likelihood that the air temperature in dwelling A at a certain time point (e.g., in one hour) matches the setpoint temperature and thereby enhances user comfort.

FIG. 4 illustrates an example of a technique for improving energy efficiency of a climate control component based on monitoring temperature data generated by climate control components of adjoining property dwellings. In this example, an MDU includes four dwellings—dwellings A, B, C, and D. Each of dwellings A-D includes a control unit for coordinating a monitoring system within a corresponding dwelling. For example, control unit 402A is located in dwelling A, control unit 402B is located in dwelling B, control unit 402C is located in dwelling C, and control unit 402D is located in dwelling D. Control units 402A-D communicate with server 150. In this example, though control units 402A-D are each associated with distinct monitoring systems that do not share communications (e.g., control units 402A-D are connected to different LANs), control units 402A-D may be associated with the same monitoring service and/or monitoring platform.

The technique shown in FIG. 4 proceeds in a set of enumerated steps. At step 1, the server 150 obtains monitoring data from control units 402A-D. As discussed throughout, the server 150 can obtain the data periodically (e.g., hourly, daily, weekly, monthly) or on ad-hoc basis based on the configuration of the MDU. In some instances, the server 150 collects the data in response to certain trigger event, such as a climate control component being enabled or disabled in one of the dwellings A-D, an indication that all climate control units are actively heating or cooling, or based on external weather conditions that may have an impact on temperature monitoring within dwellings A-D.

As shown in FIG. 4, monitoring data 410B, 410C, and 420D indicate various types of information relating to present conditions at dwellings B, C, and D. Monitoring data 410B and 310C indicate that climate control components in dwellings B and C are currently turned on (ongoing heating operations). Monitoring data 410D indicates that a climate control component in dwelling D is also turned on (ongoing heating operation), that the current ambient temperature within dwelling D is 78 F, and that the present heating rate is 2 F/hour. The server 150 monitors information specified by monitoring data 410B, 410C, and 410D in parallel to develop inferences relating to temperature regulation in dwellings B, C, and D.

At step 2, server 150 compares information within monitoring data 410D to information specified in model data 412 and determines that the current heating rate in dwelling D is higher than the average heating rate that were recorded during previous heating operations (when no heating operations were being conducted in dwellings B and C). This determination is based on the monitoring data 410D indicating a present heating rate of 2 F/hour, which is higher than an average heating rate of 1 F/hour in the model data 412 when climate control components in dwellings B and C were turned off. Since both monitoring data 410D and model data 412 identify the same ambient temperature (78 F), server 150 can use the comparison of their heating performances to assess any impacts on heating in dwelling D based on ongoing heating operations in dwellings B and C during the same time period.

At step 3, server 150 determines a potential heating leak effect in dwelling D based on monitoring data 410A, 410B, 410C and model data 412. This determination is based on the discrepancy between the heating rate specified by the monitoring data 410D and the average heating rate specified by the model data 412 when no heating operations were being conducted in dwellings B and C. Given this discrepancy, server 150 may determine that heating operations in dwellings B and C produce a heating leak effect that increases the rate of heating when a heating operation is also conducted in dwelling D.

For example, given that ongoing heating operations are being performed in dwellings B and C, server 150 determines that there may be a potential heating leak effect in dwelling D since heating performance is higher compared to historical heating performance when heating operations are not being performed in dwellings B and C. In some instances, this determination can also be based on cross-referencing historical data relating to heating performance in dwelling D when climate control components in dwellings B and C are turned on. In such instances, server 150 can use this information to confirm that the increased heating rate in dwelling D is attributable to ongoing heating operations being performed in dwellings B and C.

At step 4, server 150 generates a coordination instruction 414 based on determining a potential heating leak effect in dwelling D. Server 150 determines that the current heating rate in dwelling D (2 F/hour) will result in achieving a target temperature earlier than anticipated since the heating performance is increased relative to historical heating performance in dwelling D when heating operations are not being performed in parallel in dwellings B and C. Given this prediction, server 150 identifies an opportunity to reduce energy consumption by terminating the ongoing heating operation in dwelling D early once the ambient temperature reaches the target temperature. For example, if the heating operation in dwelling D was initially configured for two hours (based on the average heating rate of 1 F/hour), then the instruction 414 may reduce the time period for the heating operation to one hour (based on the current heating rate of 2 F/hour due to ongoing heating operations also being performed in dwellings B and C).

Server 150 provides the instruction 414 to control unit 402D, which, when received by the control unit 402D, configures a climate control component in dwelling D to adjust its heating operation. For example, if the heating operation is configured to continue for a specified time period (e.g., two hours), the instruction 414 can reduce the specified time period (e.g., one hour) to account for the increased heating rate in dwelling D. As another example, the heating operation can be adjusted from a fixed period heating operation to a heating operation that is terminated when a thermostat within dwelling D confirms that a measured ambient temperature in dwelling D matches or is sufficiently close to a target temperature. In some instances of this example, the instruction 414 may also specify the target temperature and/or adjustments to a baseline target temperature in order to account for the increased heating rate in dwelling D due to the heating leak effect. For example, the instruction 414 may reduce the target temperature to lower the extent of heating by the climate control unit of dwelling D since additional heating effects may be provided through ongoing heating operations in dwellings B and C.

As discussed above, the technique shown in FIG. 4 allows the server 150 to identify leak effects based on monitoring heating operations being conducted in parallel in multiple dwellings, identify heating performance impacts resulting from the leak effects, and using this information productively to reduce energy consumption. In the example shown in FIG. 4, the server 150 determines that ongoing heating operations in two adjoining dwelling increases heating performance in dwelling D and thereby adjusts the configuration of a climate control component within dwelling D to account for this. This can be used to reduce energy consumption in dwelling D (and the MDU) since the ongoing heating operation in dwelling D can be terminated early and/or the target temperature used for the ongoing heating operation may be reduced such that the extent of heating within dwelling D is reduced.

Figure 5:
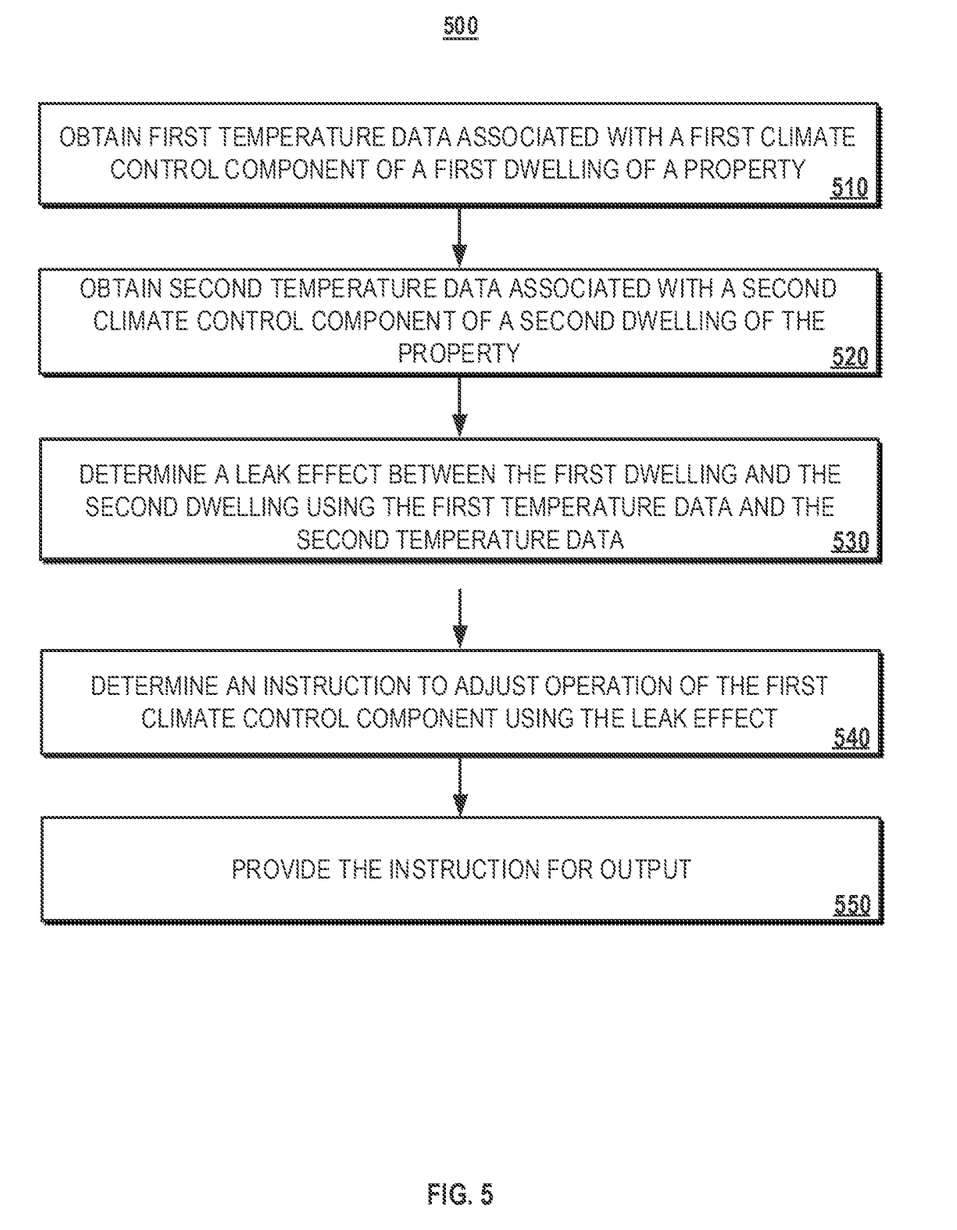
FIG. 5 illustrates an example of a process for adjusting an climate control component of a property dwelling based on monitoring temperature data generated by climate control components of adjoining property dwellings.

FIG. 5 illustrates an example of a process 500 for adjusting a climate control component of a property dwelling based on monitoring temperature data generated by climate control components of adjoining property dwellings. Briefly, the process 500 includes the operations of obtaining first temperature data associated with a first climate control component of a first dwelling of a property (510), obtaining second temperature data associated with a second climate control component of a second dwelling of the property (520), determining a leak effect between the first dwelling and the second dwelling using the first temperature data and the second temperature data (530), determining an instruction to adjust operation of the first climate control component using the leak effect (540), and providing the instruction for output (550).

In more detail, the process 500 includes the operation of obtaining first temperature data associated with a first climate control component of a first dwelling of a property (510). For example, the server 150 can obtain first temperature data associated with climate control component 130A of dwelling 1 of property 101. As discussed throughout, the temperature data can include various types of information associated with temperature regulation in dwelling 1. Examples of such information specified by the temperature data include a status of climate control component 130A (e.g., off, ongoing cooling operation, ongoing heating operation, economy mode, etc.), a current ambient temperature measured in the dwelling 1, an estimated heating/cooling performance of the climate control component 130A (e.g., heating rate, cooling rate), a setpoint temperature specified by a user of dwelling 1, a target temperature used by the climate control component 130A for temperature monitoring and regulation, among others.

The process 500 includes the operation of obtaining second temperature data associated with a second climate control component of a second dwelling of the property (520). For example, the server 150 can obtain second temperature data associated with climate control component 130B of dwelling 2 of property 101. As discussed throughout, the temperature data can include various types of information associated with temperature regulation in dwelling 2. Examples of such information specified by the temperature data include a status of climate control component 130B (e.g., off, ongoing cooling operation, ongoing heating operation, economy mode, etc.), a current ambient temperature measured in the dwelling 2, an estimated heating/cooling performance of the climate control component 130B (e.g., heating rate, cooling rate), a setpoint temperature specified by a user of dwelling 1, a target temperature used by the climate control component 130B for temperature monitoring and regulation, among others.

In some implementations, the server 150 obtains other types of monitoring associated with the first and second dwellings in parallel with the temperature data obtained in steps 510 and 520. For example, as shown in FIG. 2, server 150 can obtain occupancy data indicating when a certain dwelling is occupied and unoccupied. In this example, the server 150 monitors occupancy data alongside a user-specified setpoint temperature to determine when to initiate a heating or cooling operation in dwellings. As discussed in reference to FIG. 2, server 150 can use occupancy data in parallel with temperature data to determine how to generate climate control instructions.

The process 500 includes the operation of determining a leak effect between the first dwelling and the second dwelling using the first temperature data and the second temperature data (530). For example, the server 150 can determine a leak effect in dwelling 1 based on the obtained temperature data associated with climate control components 130A and 130B. As discussed in reference to FIGS. 3 and 4, the server 150 can identify the leak effect based on processing information specified by the first temperature data and the second temperature data. In some instances, server 150 determines a leak effect if heating/cooling performance in a dwelling deviates from average performance in similar circumstances. In the example shown in FIG. 3, server 150 determines a heating leak effect in a dwelling since its current heating performance is higher than the average heating performance under similar circumstances (e.g., same ambient temperature, same configuration of heating operations in adjoining dwellings). In other instances, server 150 determines a leak effect if heating/cooling performance in a dwelling deviates from average performance in circumstances where ongoing heating/cooling operations are not being performed in adjoining dwellings. In the example shown in FIG. 4, server 150 determines a heating leak effect in a dwelling since its current heating performance (when heating operations are also being performed simultaneously in two adjoining units) is higher than average heating performance (when heating operations are not being performed simultaneously in two adjoining units). This information is used to predict that heating operations in the two adjoining properties may contribute to the increased heating performance.

The process 500 includes the operation of determining an instruction to adjust operation of the first climate control component using the the leak effect (540). For example, the server 150 can determine an instruction to adjust operation of the climate control component 130A based on the leak effect. The server 150 may generate different types of instructions in various implementations. For instance, in the example depicted in FIG. 2, server 150 generates an instruction 206A to reduce the total time of a heating operation is performed in a dwelling since adjoining dwellings are also expected to have heating operations running during the same time period. In the example depicted in FIG. 3, the server 150 generates a coordination instruction 314 to initiate a cooling operation to offset additional heating in a dwelling resulting from a heating leak effect. In the example depicted in FIG. 4, the server 150 generates a coordination instruction 414 to terminate a heating operation early due to additional heating in a dwelling resulting from a heating leak effect.

The process 500 includes the operation of providing the instruction for output, e.g., to the first climate control component (550). For example, the server 150 can provide the instruction for output to the control unit 110A. The instruction, once received by the control unit 110A, can be used to adjust the configuration of climate control component 130A in various fashions as discussed throughout.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
  obtaining first temperature data associated with a first climate control component of a first dwelling of a property;
  obtaining second temperature data associated with a second climate control component of a second dwelling of the property;
  determining a leak effect between the first dwelling and the second dwelling using the first temperature data and the second temperature data;
  determining an instruction to adjust operation of the first climate control component using the leak effect; and
  providing the instruction to the first climate control component.

2. The method of claim 1, comprising:
  obtaining occupancy data indicating the first dwelling of the property is occupied or unoccupied,
  wherein determining the instruction comprises determining the instruction to adjust operation of the first climate control component using the occupancy data.

3. The method of claim 1, wherein determining the leak effect comprises:
  determining that a current performance of the first climate control component does not match a predicted performance of the first climate control component.

4. The method of claim 3, comprising:
  determining the predicted performance of the first climate control component using historical performance data for the first climate control component.

5. The method of claim 1, wherein the instruction is configured to, when received by the first climate control component, cause the first climate control component to adjust operation.

6. The method of claim 1, wherein the instruction is configured to, when received by the first climate control component, cause the first climate control component to increase a heating operation.

7. The method of claim 1, wherein the leak effect is a heating leak effect that causes a portion of the first dwelling to heat as a result of heating by the second climate control component.

8. The method of claim 7, wherein the instruction is configured to, when received by the first climate control component, cause the first climate control component to reduce a heating operation or increase a cooling operation.

9. The method of claim 1, wherein the leak effect is a cooling leak effect that causes a portion of the first dwelling to cool as a result of cooling by the second climate control component.

10. The method of claim 9, wherein the instruction is configured to, when received by the first climate control component, cause the first climate control component to increase a heating operation or reduce a cooling operation.

11. The method of claim 1, wherein the first temperature data or the second temperature data includes one or more of a status of the respective climate control component, a current ambient temperature measured in a portion of the respective dwelling, an estimated performance of the respective climate control component, a setpoint temperature of the respective dwelling, or a target temperature used by the respective climate control component for temperature monitoring and regulation.

12. A non-transitory computer-readable medium storing one or more instructions executable by a computer system to perform operations comprising:
   obtaining first temperature data associated with a first climate control component of a first dwelling of a property;
   obtaining second temperature data associated with a second climate control component of a second dwelling of the property;
   determining a leak effect between the first dwelling and the second dwelling using the first temperature data and the second temperature data;
   determining an instruction to adjust operation of the first climate control component using the leak effect; and
   providing the instruction to the first climate control component.

13. The medium of claim 12, wherein the operations comprise:
   obtaining occupancy data indicating the first dwelling of the property is occupied or unoccupied,
   wherein determining the instruction comprises determining the instruction to adjust operation of the first climate control component using the occupancy data.

14. The medium of claim 12, wherein determining the leak effect comprises:
   determining that a current performance of the first climate control component does not match a predicted performance of the first climate control component.

15. The medium of claim 14, wherein the operations comprise:
   determining the predicted performance of the first climate control component using historical performance data for the first climate control component.

16. The medium of claim 12, wherein the instruction is configured to, when received by the first climate control component, cause the first climate control component to adjust operation.

17. The medium of claim 12, wherein the instruction is configured to, when received by the first climate control component, cause the first climate control component to increase a heating operation.

18. The medium of claim 12, wherein the leak effect is a heating leak effect that causes a portion of the first dwelling to heat as a result of heating by the second climate control component.

19. A system, comprising:
   one or more processors; and
   machine-readable media interoperably coupled with the one or more processors and storing one or more instructions that, when executed by the one or more processors, perform operations comprising:
      obtaining first temperature data associated with a first climate control component of a first dwelling of a property;
      obtaining second temperature data associated with a second climate control component of a second dwelling of the property;
      determining a leak effect between the first dwelling and the second dwelling using the first temperature data and the second temperature data;
      determining an instruction to adjust operation of the first climate control component using the leak effect; and
      providing the instruction to the first climate control component.

20. The system of claim 19, wherein the operations comprise:
   obtaining occupancy data indicating the first dwelling of the property is occupied or unoccupied,
   wherein determining the instruction comprises determining the instruction to adjust operation of the first climate control component using the occupancy data.

* * * * *